Oct. 25, 1960 W. GERSTENBERGER 2,957,527
HYDRAULIC BOOSTER CONTROL
Original Filed Sept. 26, 1950 3 Sheets-Sheet 1

INVENTOR
WALTER GERSTENBERGER
BY
AGENT

Oct. 25, 1960 W. GERSTENBERGER 2,957,527
HYDRAULIC BOOSTER CONTROL
Original Filed Sept. 26, 1950 3 Sheets-Sheet 2

INVENTOR
WALTER GERSTENBERGER
BY
AGENT

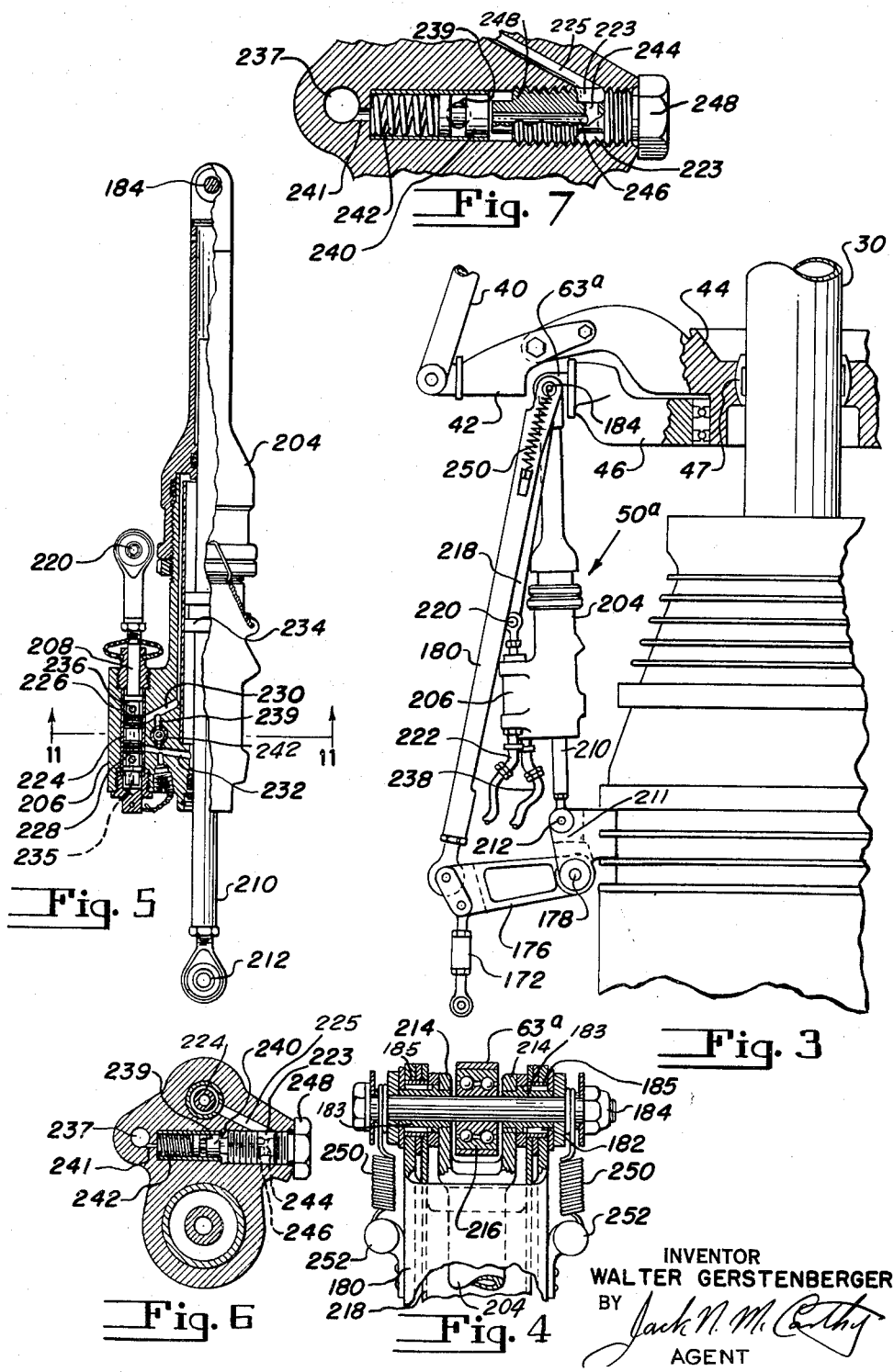

United States Patent Office 2,957,527
Patented Oct. 25, 1960

2,957,527

HYDRAULIC BOOSTER CONTROL

Walter Gerstenberger, Milford, Conn., assignor to United Aircraft Corporation, East Hartford, Conn., a corporation of Delaware Original application Sept. 26, 1950, Ser. No. 186,744, now Patent No. 2,755,870, dated July 24, 1956. Divided and this application Mar. 12, 1956, Ser. No. 570,736

5 Claims. (Cl. 170—160.25)

This invention relates to helicopters of the type in which the rotor blades are pivotally mounted on a hub for flapping and coning movement and for pitch changing movement about their longitudinal axes and in which the directional control of the helicopter is obtained by varying the pitch of the blades either collectively or cyclically by movements of a swash plate mechanism. The invention is particularly concerned with an improved servomotor, or boost mechanism, for moving the swash plate in response to movements of the primary controls by the pilot. This application is a division of Patent No. 2,755,870.

It is an object of the present invention to provide an improved control system including power operated means arranged to relieve the pilot of the dynamic and aerodynamic loads and vibrations originating in the rotor blades and to effect movement of the swash plate to control the helicopter with a minimum of force applied to the pilot's controls.

A further object of the invention is to provide an improved servo control mechanism of this type in which the pilot can instantly override the servomotor with his manual controls in the event that the servo mechanism for any reason fails in service.

Another object of this invention is to provide a servo control mechanism for a helicopter having a lost motion device between the servomotor and the connection of the pilot actuated link to the valve for moving said servomotor.

An object of this invention is to provide a servomotor mechanism in which the movable element of the servo unit is in parallel with the mechanical linkage between the stick and the swash plate member.

A still further object of the invention is the provision of means responsive to the maintenance of fluid pressure in the servo system for disabling the servo mechanism automatically in the event of failure of fluid pressure in the system.

A further object of the invention is generally to improve helicopter control systems.

These and other objects and advantages of the invention will become apparent in connection with the detailed description of two typical embodiments of the invention shown in the accompanying drawings.

In these drawings:

Fig. 3 is an enlarged detail or part of the control linkage of Fig. 2 including the servomotor mechanism.

Fig. 4 is a still further enlarged view of the connection between the servo mechanism and the swash plate;

Fig. 5 is an elevation partly in section of the modified servomotor and valve;

Fig. 6 is a section on line 6—6 of Fig. 5 rotated 90°.

Fig. 7 is an enlarged view of a part of the mechanism of Fig. 6.

Figure 1:
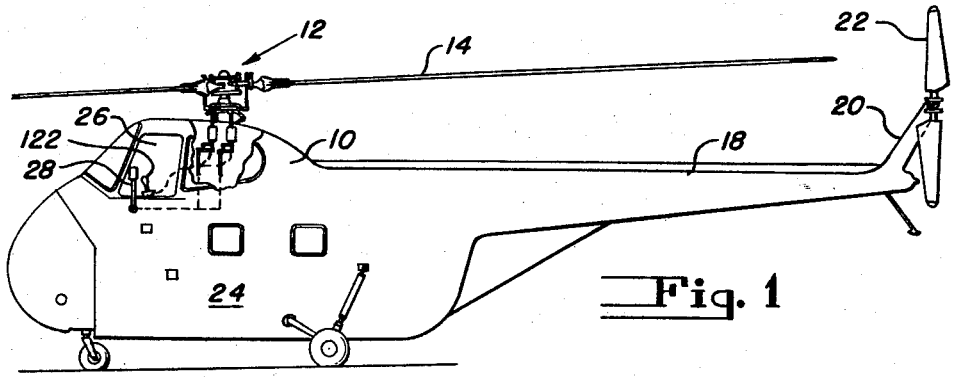
Fig. 1 is a side elevation of a helicopter embodying one form of the invention with a part of the fuselage in the vicinity of the rotor head broken away.
Figure 8:
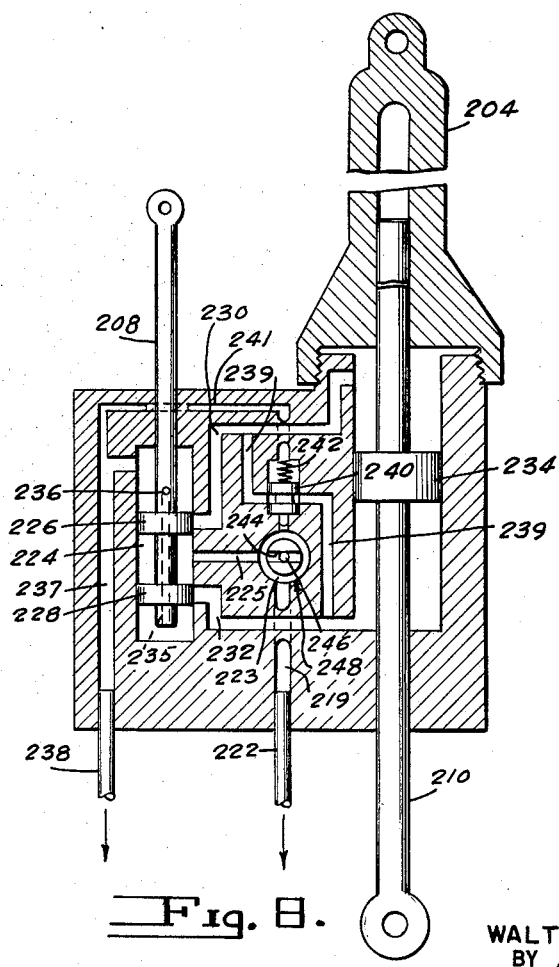
Fig. 8 is a diagrammatic view of the servo mechanism showing the interconnections of passages in the servomotor.

As herein shown in Fig. 1, the helicopter embodying the invention includes a fuselage 10 which supports a rotor head generally indicated at 12 on which a plurality of blades 14, herein three, are pivotally mounted for flapping and coning movement and also for movement about their longitudinal pitch changing axes. The helicopter also includes a tail cone 18 terminating in a pylon 20 on which a tail rotor 22 is mounted for rotation about a generally horizontal axis. The fuselage 10 has a passenger or cargo carrying compartment 24 beneath the rotor head and a pilot's compartment 26 immediately forward of the rotor head in which the usual pilot's controls are provided. These may include the usual pivoted pilot's cyclic pitch control stick 28 by which fore and aft and lateral tilting of the swash plate is effected. However, for the sake of clarity the lateral control linkages have been omitted. A usual collective pitch control stick (not shown) may also be provided.

In the embodiment shown in Figs. 2 through 7 an arrangement of the servomotor mechanism is provided in which the movable element of the servo unit is in parallel with the mechanical linkage between the stick and the swash plate member. There are three servomotor mechanisms included in this embodiment and they are identified as units A, B, and C.

Figure 2:
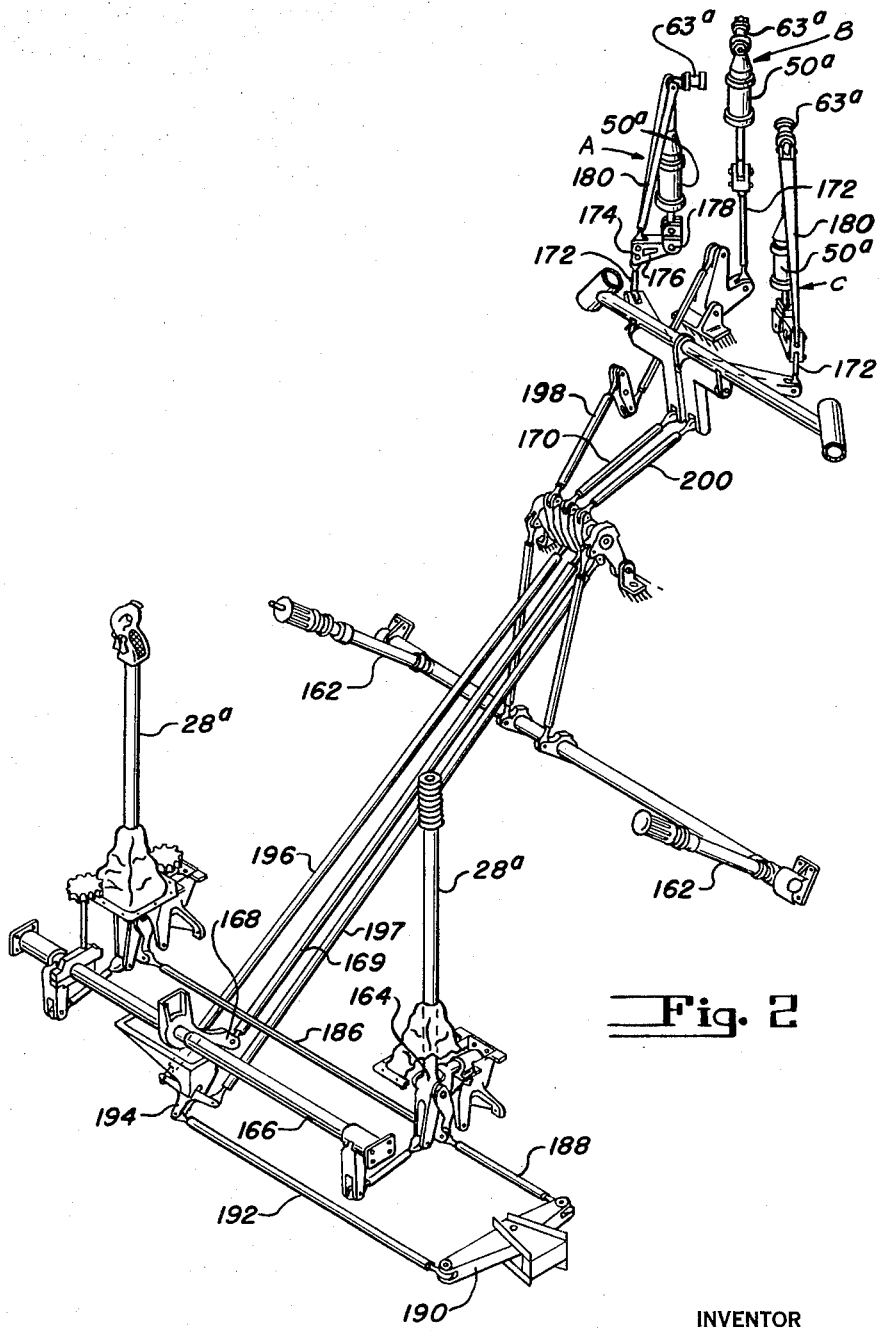
Fig. 2 is a view showing a modified form of servo mechanism and control linkage.

Referring to Fig. 2 it will be noted that dual cyclic pitch control sticks 28a are provided as well as dual collective pitch levers 162 which are connected through linkage means with bosses 63a on the stationary swash plate member (not shown). This control linkage is described more in detail in U.S. Patent No. 2,811,212.

Thus fore and aft movement of either stick 28a due to its universal support 164 will rotate shaft 166 and the arm 168 carried thereby to reciprocate thrust rods 169, 170 and 172 of unit A. This rod 172 is pivoted at its upper end at 174 to the free end of a lever 176 pivoted to fixed structure of the helicopter at 178. Lever 176 thus imparts reciprocatory movement to thrust link 180 (Figs. 2 and 4) which has a lost motion pivotal connection 182 with a pivot pin 184 carried by boss 63a on the stationary swash plate member. The lost motion is provided between sleeves 183 mounted on pin 184 in the bushings 185 of the pivot holes of link 180, each of which has an inside diameter somewhat larger than the outside diameter of each sleeve 183.

Lateral movements of sticks 28a are effected in unison by a tie rod 186. A rod 188 connects rod 186 to a rocking lever 190 and through a thrust rod 192 connects the sticks to a double bell crank 194 which has its opposite arms connected to thrust rods 196 and 197 which are differentially operated upon lateral movements of the sticks. The reciprocatory movements of rods 196 and 197 are transmitted through suitable bell cranks and rods 198 and 200 to rods 172 and rods 180, of units B and C respectively, previously described in connection with the fore and aft movements.

Referring to Fig. 3 it will be noted that the servomotor generally indicated at 50a includes a cylinder element 204, which also carries a casing 206 housing the valve 208, and a piston element 210 which is pivotally connected at its lower end at 212 to a member 211 which is fixed to structure of the helicopter. The upper end of the cylinder element 204 is pivotally connected by pivot pin 184 directly with the stationary swash plate, this connection being effected by a yoke 214 between which the boss 63a on the stationary swash plate is received. As shown in Fig. 4 the pivot pin 184 is mounted in the inner race of a ball bearing 216 the outer race of which is carried by the boss 63a. The valve 208 is pivoted at its upper end to a thrust link 218 at 220 and this thrust link is pivoted at its other end to the pivot pin 184 on the same lost motion bushings 185 carried by thrust link 180 so that the pilot valve has the same lost motion relative to the pin 184 as the thrust link.

When the pilot moves either stick 28a fore or aft, this movement is conveyed to servomotor mechanism A through the linkage described above to move the swash plate up or down at the point 63a. When the pilot moves either stick 28a to one side or the other, this movement is conveyed to servomotor mechanisms B and C moving them in opposite directions. That is, when unit B is moving its connection to the swash plate upwardly, unit C is moving its connection to the swash plate downwardly. These various movements of the servomotor mechanisms place the swash plate in various positions to provide for cyclic pitch. When the pilot desires collective pitch, he moves either of levers 162 which actuates servomotor mechanisms A, B and C equally.

The servomotor in this form operates with fluid under pressure being admitted through inlet 222 to an intermediate annular chamber 224 via passageway 219, space 223 surrounding traverse passage 244 in plug 248, and passageway 225. Upper and lower lands 226 and 228 admit the fluid under pressure through passages 230 and 232 to the upper and lower sides of piston 234, it being understood that when fluid is admitted to one side of the piston the other side of the piston is vented through suitable passages 235, 236, 237 into the fluid exit 238.

Passages 230 and 232 are connected by a by-pass passage 239 which in this embodiment is controlled by valve means automatically responsive to pressure of the fluid in space 223. This valve means includes a piston 240 (Fig. 6) which controls passage 239 and is constantly biased by a spring 242 into passage open position. The valve is normally maintained in passage closed position by fluid under pressure in space 223 which is transmitted through transverse passage 244 and axial passage 246 in a screw threaded plug member 248 to act on the face of the piston 240 in a direction to compress spring 242. Venting means are provided from the opposite side of the piston through passages 241 and 237.

It can be seen that when fluid under pressure is being admitted to the servomotor mechanism, this pressure acts on piston 240 closing passage 239 and therefore preventing passage 230 from being connected to passage 232. This in turn prevents one end of the servomotor cylinder from being connected to the other end. Now when there is a loss of fluid in the system, the pressure in inlet 222 will drop and said drop will be transmitted in turn to the valve means including piston 240. This piston 240, with the loss of the fluid pressure, will be biased into a position which will open passage 239 and connect passage 230 to passage 232. The connection of these passages in turn connects the one end of the servomotor cylinder to the other end. This connection permits manual actuation of the swash plate since fluid cannot now be trapped in the cylindrical element 204 around the piston 234.

Means is provided to partially compensate for the weight of the manually operative linkage mechanism so as to tend to maintain the pivot pin 184 substantially centered in the bushings 185 (Fig. 4). To this end a pair of tension springs 250 are connected between pin 184 and lugs 252 on thrust link 180. The presence of these springs insures that the pilot can always move the valve 208 to effect movement of any servo mechanism in either direction without having to pick up the weight of the linkage connecting the stick with the stationary swash plate member.

It will be noted in Figs. 5, 6 and 7 that there is an automatic by-pass valve piston 240.

It will be evident that as a result of this invention improved means have been provided for not only operating the swash plate by hydraulic means to relieve the pilot, but that such means has also been provided having the hydraulically operated element thereof directly connected to the stationary swash plate member to prevent vibrations and other aerodynamic forces originating in the rotor blades from being transmitted back to the stick.

It will also be evident that improved means has been provided by which the pilot can instantly override the hydraulic servo mechanism in the event of failure of the latter as well as an improved means for automatically conditioning the mechanism for manual operation in the event of such failure.

While one embodiment of the invention has been shown and described herein, it will be evident that various changes may be made in the construction and arrangement of the parts without departing from the scope of the invention.

I claim:

1. In a rotary wing aircraft having blades pivoted for pitch changing movement about their longitudinal axes, means for controlling the pitch of said blades including rotatable and non-rotatable swash plate members, a pilot control stick, a control member having one end operatively connected with said non-rotatable swash plate member and the other end connected to said pilot control stick, servomotor mechanism in parallel with said control member including piston and cylinder elements each having a free end, a member fixed to aircraft structure, one of said elements having its free end pivoted to said member fixed to aircraft structure and the other element having its free end connected to said non-rotatable swash plate member, a source of fluid under pressure, a valve for selectively admitting hydraulic fluid from said source to opposite sides of said servo piston having a direct operative connection to said pilot control stick, a passage connecting opposite sides of said servo piston, and valve means responsive to fluid pressure in said source for controlling the flow of fluid in said passage.

2. In a rotary wing aircraft having blades pivoted for pitch changing movement about their longitudinal axes, means for controlling the pitch of said blades collectively and cyclically including rotatable and non-rotatable swash plate members, pilot operated control means including a pilot operable member and linkage means connecting said pilot operable member with said non-rotatable swash plate member, said linkage means including an upright link member having a pivotal lost motion connection to said non-rotatable swash plate member, servomotor mechanism including a cooperating servo piston and housing having one end connected with said non-rotatable swash plate member and having its other end pivoted to fixed structure of said aircraft, a source of fluid under pressure, a valve for admitting hydraulic fluid from said source to opposite sides of said servo piston, link means connecting said valve to said upright link member whereby initial motion of the latter relative to said non-rotatable swash plate member operates said valve prior to direct manual operation of said swash plate.

3. In a rotary wing aircraft having blades pivoted for pitch changing movement about their longitudinal axes, means for controlling the pitch of said blades including rotatable and non-rotatable swash plate members, a servomotor mechanism including a cooperating servo piston and housing, first means pivotally connecting one end of said mechanism with said non-rotatable swash plate member, means connecting the other end of said mechanism to fixed structure of said aircraft, a source of fluid under pressure, a pilot operable member, a valve for admitting hydraulic fluid from said source to opposite sides of said servo piston, second means pivotally connecting said valve to said pilot operable member, the pivotal connection of said first means and the pivotal connection of said second means having a common pivotal axis at rest, the pivotal connection of said first means having a lost motion connection with the pivotal connection of said second means.

4. In a rotary wing aircraft having blades pivoted for pitch changing movement about their longitudinal axes, means for controlling the pitch of said blades including rotatable and non-rotatable swash plate members, a servomotor mechanism including a cooperating servo piston and housing, first means connecting one end of said mechanism with said non-rotatable swash plate member, said first means comprising a pin passing through a portion of both said one end of said mechanism and said non-rotatable swash plate member, a member fixed to said aircraft, means connecting the other end of said mechanism to said member comprising a pin passing through a portion of both said other end of said mechanism and said member fixed to said aircraft, a source of fluid under pressure, a pilot operable member, a valve for admitting hydraulic fluid from said source to opposite sides of said servo piston, a link having one end connected to said valve, second means connecting the other end of said link to said pilot operable member, said second means comprising bushing means passing through a portion of both said link and said pilot operable means, said pin and said bushing means having a common axis when at rest, said bushing means surrounding said pin and having a larger inner diameter than the outer diameter of the pin providing a lost motion connection.

5. In a rotary wing aircraft having blades pivoted for pitch changing movement about their longitudinal axes, means for controlling the pitch of said blades including rotatable and non-rotatable swash plate members, a servomotor mechanism including a cooperating servo piston and housing, first means connecting one one of said mechanism with said non-rotatable swash plate member, said first means comprising a pin passing through a portion of both said one end of said mechanism and said non-rotatable swash plate member, means connecting the other end of said mechanism to fixed structure of said aircraft, a source of fluid under pressure, a pilot operable member, a valve for admitting hydraulic fluid from said source to opposite sides of said servo piston, a link having one end connected to said valve, second means connecting the other end of said link to said pilot operable member, said second means comprising bushing means passing through a portion of both said link and said pilot operable means, said pin and said bushing means having a common axis at rest, said bushing means surrounding said pin and having a larger inner diameter than the outer diameter of the pin providing a lost motion connection, and resilient means connected between said pilot operable member and said non-rotatable swash plate member to locate said bushing means around said pin.

References Cited in the file of this patent

UNITED STATES PATENTS

| Re. 22,728 | Burton et al. | Mar. 5, 1946 |
| 2,179,179 | Fischel et al. | Nov. 7, 1939 |
| 2,337,706 | Berry | Dec. 28, 1943 |
| 2,405,188 | Campbell | Aug. 6, 1946 |

UNITED STATES PATENT OFFICE
CERTIFICATE OF CORRECTION

Patent No. 2,957,527　　　　　　　　　　　　　　　　October 25, 1960

Walter Gerstenberger

It is hereby certified that error appears in the printed specification of the above numbered patent requiring correction and that the said Letters Patent should read as corrected below.

Column 6, line 5, for "one" read -- end --.

Signed and sealed this 11th day of April 1961.

(SEAL)
Attest:

ERNEST W. SWIDER
Attesting Officer

ARTHUR W. CROCKER
Acting Commissioner of Patents